Figures 1, 2:
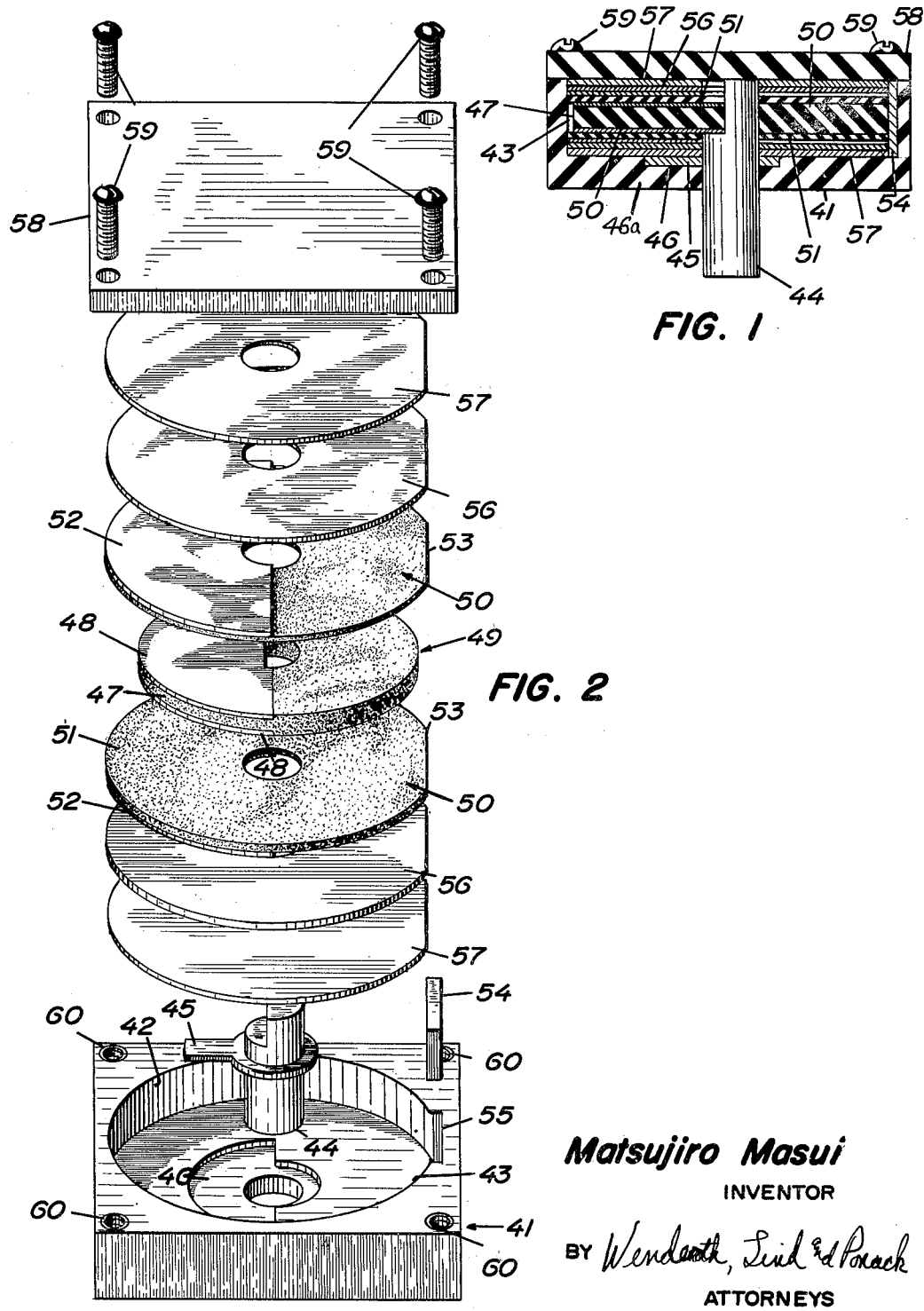

Sept. 28, 1965  MATSUJIRO MASUI  3,209,219
VARIABLE DISK CAPACITOR
Original Filed March 17, 1959

Matsujiro Masui
INVENTOR

BY Wendroth, Lind & Ponack
ATTORNEYS

United States Patent Office 3,209,219
Patented Sept. 28, 1965

3,209,219
VARIABLE DISK CAPACITOR
Matsujiro Masui, Nishinomiya-shi, Japan, assignor to Matsushita Electric Industrial Co., Ltd., Osaka, Japan
Original application Mar. 17, 1959, Ser. No. 799,971. Divided and this application May 27, 1963, Ser. No. 283,295
Claims priority, application Japan, Mar. 25, 1958, 33/14,961; Apr. 3, 1958, 33/16,951; Apr. 4, 1958, 33/17,127, 33/17,128, 33/17,129; June 14, 1958, 33/30,339; June 16, 1958, 33/30,783, 33/30,784, 33/30,785; July 16, 1958, 33/36,677, 33/36,678, 33/36,679, 33/36,680; Dec. 19, 1958, 33/67,522, 33/67,527; Feb. 12, 1959, 34/7,721; Feb. 23, 1959, 34/10,100
4 Claims. (Cl. 317—254)

This application is a division of Serial No. 799,971, filed March 17, 1959, and now abandoned.

The present invention relates to a variable capacitor and particularly to a variable capacitor especially suitable for use in small-sized radio receiving sets.

The present invention is intended to provide a novel and improved high performance variable capacitor which has a large and stable capacity capable of fine adjustment and complies with the recent trend of radio receiving sets toward smaller sizes.

A further object of the present invention is to provide a variable capacitor having a large capacity relative to its dimensions in which rotary and stationary electrode plates are spaced apart from each other by a layer or layers of solid dielectric material alone thereby to increase the dielectric constant of the capacitor.

Another object of the present invention is to provide a variable capacitor in which many of essential component parts each serve a plurality of purposes and which is easy to manufacture, rugged in construction, and highly durable.

These and other objects, features and advantages of the present invention will be apparent from the following detailed description of some embodiments of the invention.

According to the present invention, there is provided a variable capacitor which has an inner electrode element and a pair or outer electrode elements respectively disposed on opposite sides of said inner electrode element, all of said electrode elements being relatively rotatably pressed together with solid dielectric layers interposed between said inner electrode element and said outer electrode elements in such manner as to provide a capacity variable with relative angular movement of said inner and outer electrode elements.

According also to the invention there is provided a variable capacitor of the kind described in which an inner electrode element is rotatable and a pair of outer electrode elements are stationary.

According also to the present invention, a variable capacitor comprises a casing tightly enclosing an assembly of a rotary electrode disc and a pair of stationary electrode discs disposed on opposite sides of said rotary electrode disc.

According to a further feature of the invention, a recess is formed in a wall of the casing of the variable capacitor for providing stop means for limiting the movement of a lug extending from the rotatable shaft carrying the rotary electrode disc.

The above and other objects, features and advantages of the present invention will become more apparent from the following detailed description taken in connection with the accompanying drawings which illustrate several embodiments, chosen by way of example, of the variable capacitor according to the invention, and in which:

FIGURE 1 is a longitudinal cross sectional view of a cylindrical variable capacitor according to the present invention, illustrating the basic structure thereof; and FIGURE 2 is an exploded perspective view of component parts of the variable capacitor shown in FIGURE 1.

Referring now to the figures illustrating a preferred embodiment of the present invention, reference numeral 41 designates a casing for the variable capacitor which is of insulating material and has a circular inner wall 42 defining a recess 43 for accommodating an electrode assembly. At the bottom of this recess 43 a semicircular cavity 46 is formed in the inside surface of end wall 46a. A stop lug 45 projects radially from one end of a rotatable shaft 44 and engages in said recess 36, moving from one end of the recess to the other so as to limit rotation of shaft 44 within a predetermined angular range, in this instance 180°. Firmly secured to the rotatable shaft 44 is a rotary disc 49 comprising an insulating plate 47 with a pair of semicircular electrode discs 48—48 adhered or otherwise joined to opposite surfaces of said plate 47 and in electrical connection with a contact means (not shown) through shaft 44. A pair of stationary discs 50—50 are arranged so as to embrace this rotary disc therebetween. Each of the stationary discs 50—50 comprises a dielectric insulating plate 51 made of titanium oxide having a semicircular metal sheet 52 coated on the back thereof. The stationary disc 50 has a segment removed therefrom to form a flat 53 formed on the periphery thereof for cooperating with a fixing element 54 in the form of a rectangular plate which is inserted into a space defined by said flat 53 of the stationary disc 50 and the inner wall 42 of the recess 43 formed in the casing 41, thereby firmly securing the stationary disc 50 relative to the casing 41. The inner wall can have formed therein a slot 55 for further ensuring the retention of said fixing element 54. Bearing against the back of each of the stationary discs is a resilient plate 56 for pressing the discs against the rotary disc. A washer 57 is provided between each resilient plate 56 and the casing 41. The rotary disc 49, stationary discs 50—50, resilient plates 46—46, and washers 57—57 are all accommodated in the recess 43 in the casing 41, and tightly enclosed by a closure member 58. The closure 58 is secured to the casing by screws 59, which can also serve as electrode terminals by electrically connecting them by means of internally threaded inserts 60 embedded in the casing 41 to the stationary discs 50. Thus, the stationary discs 50 can be connected in a circuit so as to be of one polarity and the movable discs can be connected so as to be of the other polarity.

According to the present invention, the stationary discs 50—50 may be fixed to the casing 41 by interposing a fixing element 54 between flat 53 formed on the periphery of the stationary disc 50 and the inner wall 42 of the recess 43 formed in the housing 41 for accommodating the electrode assembly, as described hereinbefore. Various fixing elements 54 of different thicknesses can be made available so that a fixing element of any desired thickness may be selectively used to firmly secure the respective stationary discs 50—50. The assembling operation of the variable capacitor is thereby greatly facilitated, and further, the stationary discs can be easily fixed in a predetermined angular position. In such construction, the stationary discs are prevented from being damaged even where they are made of brittle material such as titanium oxide. It will be appreciated that such structure is very useful from a practical standpoint in that it makes it possible to make the variable capacitor in small sizes.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What I claim is:

1. A variable capacitor comprising a rotatable shaft, a rotary disc having electrode members of one polarity on opposite sides of said rotary disc, said rotary disc being secured to said rotatable shaft, a pair of stationary electrode discs of the other polarity respectively disposed on opposite sides of said rotary electrode disc, a layer of solid dielectric material on the surface of each of said stationary electrode discs, a pair of resilient plates respectively disposed on the sides of said stationary discs remote from said rotary disc, a casing of non-conductive material tightly enclosing said rotary electrode disc, said pair of stationary electrode discs, and said resilient discs, said casing having a bottom portion in which one end of said rotatable shaft is rotatably mounted, said bottom portion having a cavity therein opening into the interior of said casing, and lug means rigidly mounted on said shaft and extending radially of said shaft and being located in said cavity and movable therein from one end of the cavity to the other so that the rotation of the shaft is limited by said lug abutting against the opposite ends of said cavity.

2. A variable capacitor as claimed in claim 1 in which said cavity is semicircular.

3. A variable capacitor as claimed in claim 1 in which said stationary electrode discs have a flat edge thereon, and a fixing element between said flat edges and the inside wall of the interior of said casing and holding said stationary discs against rotation within the casing.

4. A variable capacitor as claimed in claim 1 in which said casing has a recess in the inside wall of the interior thereof in which said fixing element is positioned to hold it against movement.

References Cited by the Examiner

UNITED STATES PATENTS

| 1,572,504 | 2/26 | Perlesz | 317—253 |
| 2,913,645 | 11/59 | Hansen | 317—249 |

FOREIGN PATENTS 256,167  2/27  Great Britain.

JOHN F. BURNS, *Primary Examiner.*